(12) United States Patent
Yu et al.

(10) Patent No.: US 12,293,045 B2
(45) Date of Patent: May 6, 2025

(54) TOUCH DISPLAY PANEL WITH AUXILIARY STRUCTURE FOR IMPROVING UNIFORMITY OF WIRING DISTRIBUTION AND ELECTRONIC TERMINAL

(71) Applicant: Wuhan China Star Optoelectronics Semiconductor Display Technology Co., Ltd., Wuhan (CN)

(72) Inventors: Shengrong Yu, Wuhan (CN); Liang Ma, Wuhan (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 0 days.

(21) Appl. No.: 17/793,424

(22) PCT Filed: Jul. 5, 2022

(86) PCT No.: PCT/CN2022/103906
§ 371 (c)(1),
(2) Date: Jul. 18, 2022

(87) PCT Pub. No.: WO2023/231137
PCT Pub. Date: Dec. 7, 2023

(65) Prior Publication Data
US 2024/0192810 A1    Jun. 13, 2024

(30) Foreign Application Priority Data
May 30, 2022 (CN) .......................... 202210601422.9

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04111* (2013.01)

(58) Field of Classification Search
CPC ...................................................... G09G 3/044
See application file for complete search history.

(56) References Cited

U.S. PATENT DOCUMENTS

| 2013/0162596 | A1* | 6/2013 | Kono | .................. G06F 3/03547 345/174 |
|---|---|---|---|---|
| 2018/0210577 | A1 | 7/2018 | Chan | |
| 2019/0235664 | A1* | 8/2019 | Kwak | ................. G06F 3/04164 |

FOREIGN PATENT DOCUMENTS

| CN | 110688034 A | 1/2020 |
|---|---|---|
| CN | 112114702 A | 12/2020 |

(Continued)

OTHER PUBLICATIONS

International Search Report in International application No. PCT/CN2022/103906, mailed on Nov. 28, 2022.

(Continued)

*Primary Examiner* — William Boddie
*Assistant Examiner* — Andrew B Schnirel
(74) *Attorney, Agent, or Firm* — Nathan & Associates; Menachem Nathan (57) ABSTRACT

A touch display panel and an electronic terminal are disclosed in the present application, including a first conductive layer and a second conductive layer of different layers, and an insulation layer is arranged between the first conductive layer and the second conductive layer. The first conductive layer includes a plurality of touch electrodes arranged along a first direction and a second direction. The second conductive layer includes a first touch lead and a first auxiliary structure both overlapped with a first touch electrode in the plurality of touch electrodes. The first auxiliary structure is located on at least one side of the first touch lead.

13 Claims, 8 Drawing Sheets

(56) References Cited

FOREIGN PATENT DOCUMENTS

| CN | 113838871 A | 12/2021 |
| CN | 113970985 A | 1/2022 |

OTHER PUBLICATIONS

Written Opinion of the International Search Authority in International application No. PCT/CN2022/103906, mailed on Nov. 28, 2022.

* cited by examiner

TOUCH DISPLAY PANEL WITH AUXILIARY STRUCTURE FOR IMPROVING UNIFORMITY OF WIRING DISTRIBUTION AND ELECTRONIC TERMINAL

BACKGROUND OF DISCLOSURE

Technical Field

The present application relates to a technical field of displays, in particular, to a field of display panel manufacturing technology, and specifically, to a touch display panel and an electronic terminal.

Description of Prior Art

Touch screens can eliminate a traditional data input system such as buttons, keyboards, or mice to achieve basic human-computer interaction functions, of which capacitive touch screens are most widely used.

At present, compared with mutual-capacitive touch screens, self-capacitive touch screens have an advantage of a smaller product of resistance and capacitance, so they have a faster response speed. However, in existing self-capacitive touch screens, touch leads are overlapped in some areas of a touch block, while the touch leads are not overlapped in other areas of the touch block, resulting in uneven distribution of wirings containing the touch leads in different areas of the touch block, resulting in uneven picture display, which reduces picture display quality of the self-capacitive touch screens.

Therefore, the existing self-capacitive touch screens have a problem of low picture display quality caused by uneven distribution of a plurality of touch leads on a plurality of touch blocks, which is in urgent need of improvement.

BRIEF SUMMARY OF DISCLOSURE

Technical Problem

A touch display panel and an electronic terminal are provided in embodiments of the present application, so as to solve a technical problem of low picture display quality caused by uneven distribution of touch leads on touch blocks of existing self-capacitive touch screens.

A touch display panel is provided in embodiments of the present application, which comprises:
- a first conductive layer comprising a plurality of touch electrodes arranged along a first direction and a second direction, the first direction being different from the second direction, and the plurality of touch electrodes comprising a first touch electrode;
- a second conductive layer arranged on one side of the first conductive layer; and
- an insulation layer arranged between the first conductive layer and the second conductive layer;
- wherein the second conductive layer comprises a first touch lead and a first auxiliary structure both overlapped with the first touch electrode, and the first auxiliary structure is located on at least one side of the first touch lead.

The touch display panel and the electronic terminal provided in the embodiments of the present application, comprise the first conductive layer comprising the plurality of touch electrodes arranged along the first direction and the second direction, the first direction is different from the second direction, and the plurality of touch electrodes comprise the first touch electrode; the second conductive layer arranged on one side of the first conductive layer; the insulation layer arranged between the first conductive layer and the second conductive layer; wherein the second conductive layer comprises the first touch lead and the first auxiliary structure both overlapped with the first touch electrode, and the first auxiliary structure is located on at least one side of the first touch lead. In the present application, the first auxiliary structure overlapped with the first touch electrode and located on at least one side of the first touch lead is provided to increase wiring distribution density in an area of the first touch electrode where the first touch lead is not projected, so as to weaken a difference in wiring arrangement density between the area and an area where the first touch lead is projected, and improve uniformity of projected wiring distribution in the first touch electrode, so as to improve uniformity of picture display of the touch display panel.

BRIEF DESCRIPTION OF DRAWINGS

Technical solution and other advantageous effects of the present application will be apparent through a detailed description of specific embodiments of the present application in combination with accompanying drawings.

DETAILED DESCRIPTION OF PREFERRED EMBODIMENTS

Technical scheme in embodiments of the present application will be clearly and continuously described below in combination with accompanying drawings in the embodiments of the present application. Obviously, described embodiments are only part of the embodiments of the present application, not all of them. Based on the embodiments in the present application, all other embodiments obtained by those skilled in the art without making creative work fall within a protective scope of the present application.

In a description of the present application, it should be understood that an orientation or position relationship indicated by terms "approach", "extend", "side" and so on is based on an orientation or position relationship shown in the accompanying drawings. It is only for convenience of describing the present application and simplifying the description, and does not indicate or imply that a device or an element must have a specific orientation, be constructed and operated in a specific orientation. Therefore, it cannot be understood as a limitation of the present application. In addition, terms "first", "second" and the like are used only for descriptive purposes and cannot be understood as indicating or implying relative importance or implicitly indicating a number of indicated technical features. Therefore, features defined as "first" and "second" may explicitly or implicitly include one or more of the features. In the description of the present application, "a plurality of" means two or more, unless otherwise expressly and specifically defined.

A reference to "embodiments" here means that specific features, structures, or characteristics described in connection with the embodiments may be included in at least one embodiment of the present application. The phrase appearing at various positions in the specification does not necessarily refer to a same embodiment, nor is it an independent or alternative embodiment mutually exclusive with other embodiments. Those skilled in the art explicitly and implicitly understand that the embodiments described here may be combined with other embodiments A touch display panel is provided in the embodiment of the present application, which includes following embodiments and combinations of following embodiments, and is not limited here.

In an embodiment, as shown in FIGS. 1 to 3, FIG. 6, and FIGS. 9 to 10, the touch display panel 100 includes: a first conductive layer 30 including a plurality of touch electrodes 3011 arranged along a first direction 01 and a second direction 02, the first direction 01 is different from the second direction 02, and the plurality of touch electrodes 3011 include a first touch electrode 30111; a second conductive layer 40 arranged on one side of the first conductive layer 30; an insulation layer 50 arranged between the first conductive layer 30 and the second conductive layer 40; wherein the second conductive layer 40 includes a first touch lead 40111 and a first auxiliary structure 40211 both overlapped with the first touch electrode, and the first auxiliary structure 40211 is located on at least one side of the first touch lead 40111.

It should be noted that, for the first touch electrode 30111, a vertical projection of the first touch lead 40111 on the first touch electrode 30111 cannot occupy a larger area of the first touch electrode 30111, that is, the first touch electrode 30111 further has a larger blank area being not overlapped with the first touch lead 40111. If no wiring is projected in the blank area, there will be a greater difference in wiring arrangement density between an area overlapped with the first touch lead 40111 in the first touch electrode 30111 and the larger blank area, resulting in uneven vertical projection distribution of the wiring in the first touch electrode 30111, and resulting in uneven picture display.

Wherein, a specific position of the first touch electrode 30111 is not limited in the embodiment, as long as that the first touch electrode 30111 is any one of the touch electrodes 3011. Meanwhile, in this embodiment, there is no restriction on whether the first touch lead 40111 is electrically connected to the first touch electrode 30111 or not, that is, the first touch lead 40111 can be a touch lead electrically connected to or not electrically connected to the first touch electrode 30111, and it is only necessary that the first touch lead 40111 and the first auxiliary structure 40211 arranged on a same layer are overlapped in the "larger blank area" of the first touch electrode 30111 mentioned above.

It can be understood that based on the first touch electrode 30111 and the first touch lead 40111, the first auxiliary structure 40211 overlapped with the first touch electrode 30111 and located on at least one side of the first touch lead 40111 is further provided in the embodiment; that is, a vertical projection of the first auxiliary structure 40211 on the first touch electrode 30111 in this embodiment can be filled in the "larger blank area" mentioned above in the first touch electrode 30111, so as to weaken the difference in the wiring arrangement density between the "large blank area" and an area where the first touch lead 40111 is projected, and improve uniformity of wiring distribution in the first touch electrode 30111, and improve uniformity of picture display of the touch display panel 100.

In an embodiment, as shown in FIGS. 2 to 3, FIG. 6, and FIGS. 9 to 10 in combination, the first conductive layer 30 further includes a second touch electrode 30112 arranged along the first direction 01 with the first touch electrode 30111. The first touch lead 40111 extends to be overlapped with and be electrically connected to the second touch electrode 30112. The second conductive layer 40 further includes a second auxiliary structure 40212 overlapped with the second touch electrode 30112, and the second auxiliary structure 40212 is located on at least one side of the first touch lead 40111.

Figure 1:
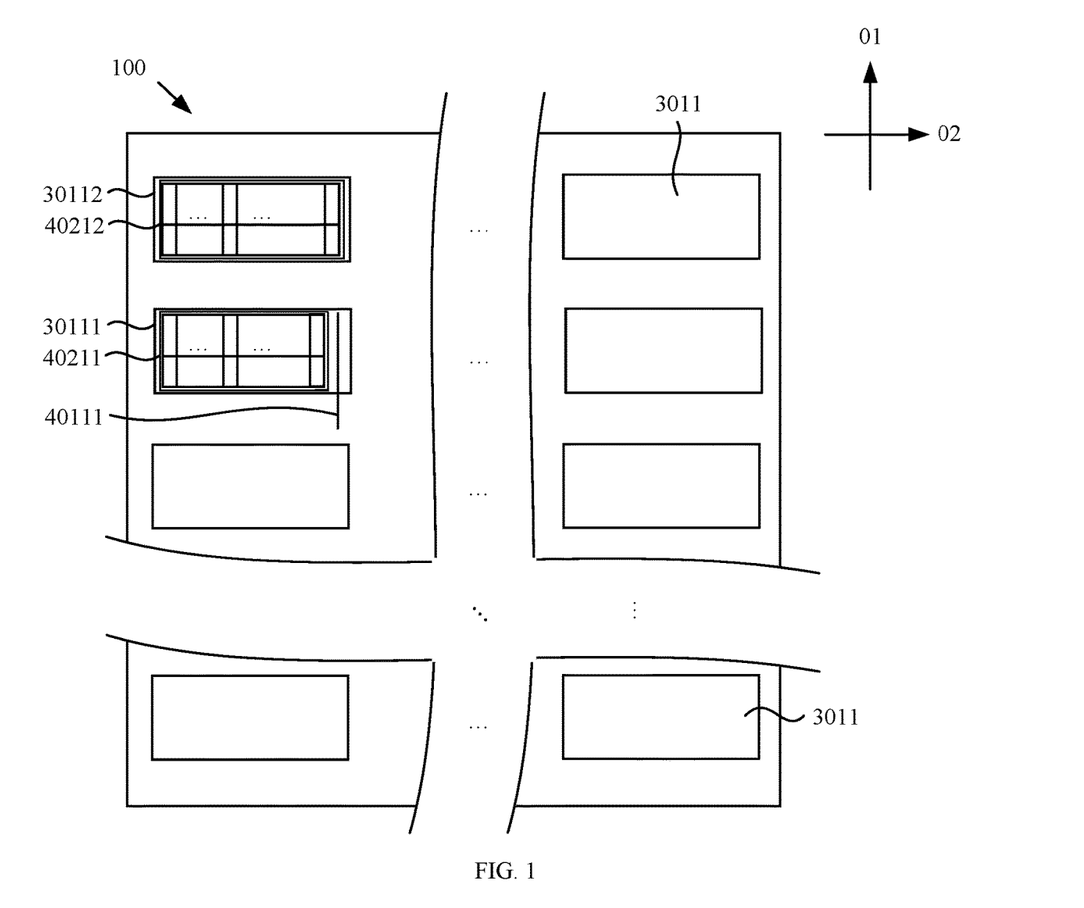
FIG. 1 is a bottom view of a touch layer in a first touch display panel provided in an embodiment of the present application.
Figure 2:
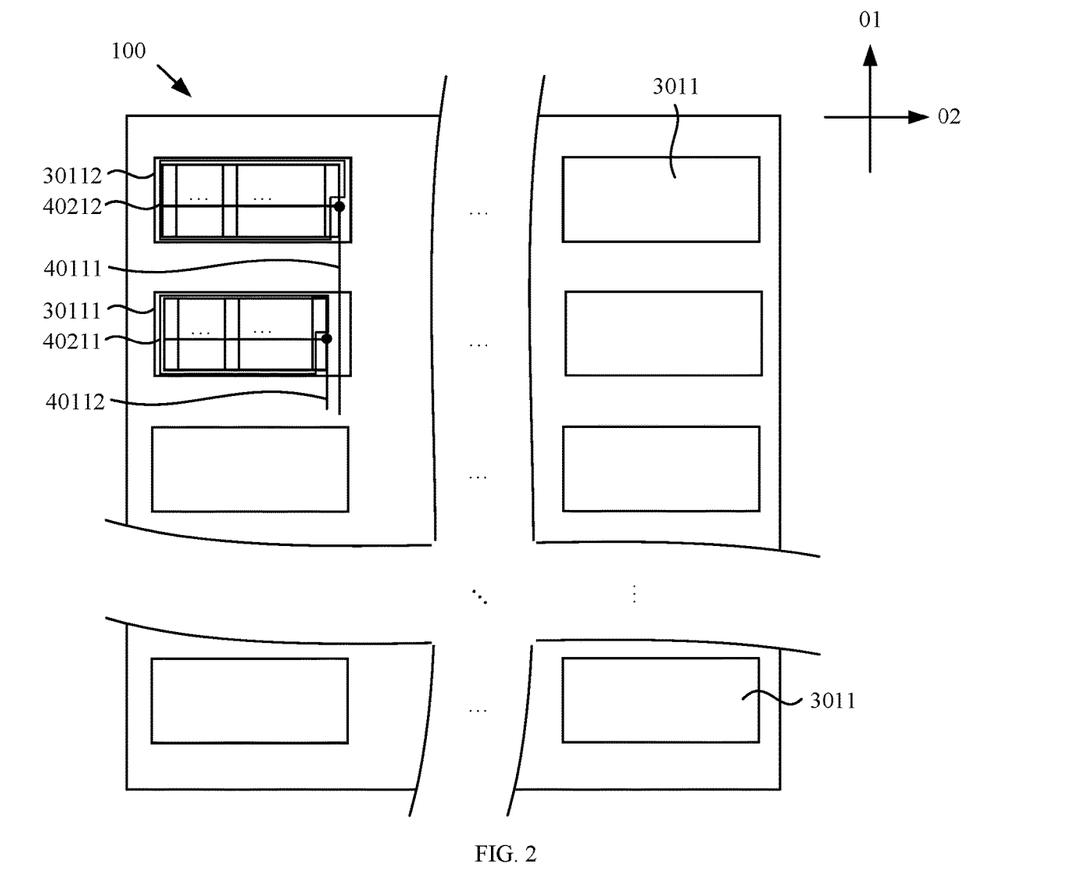
FIG. 2 is a bottom view of a touch layer in a second touch display panel provided in an embodiment of the present application.
Figure 3:
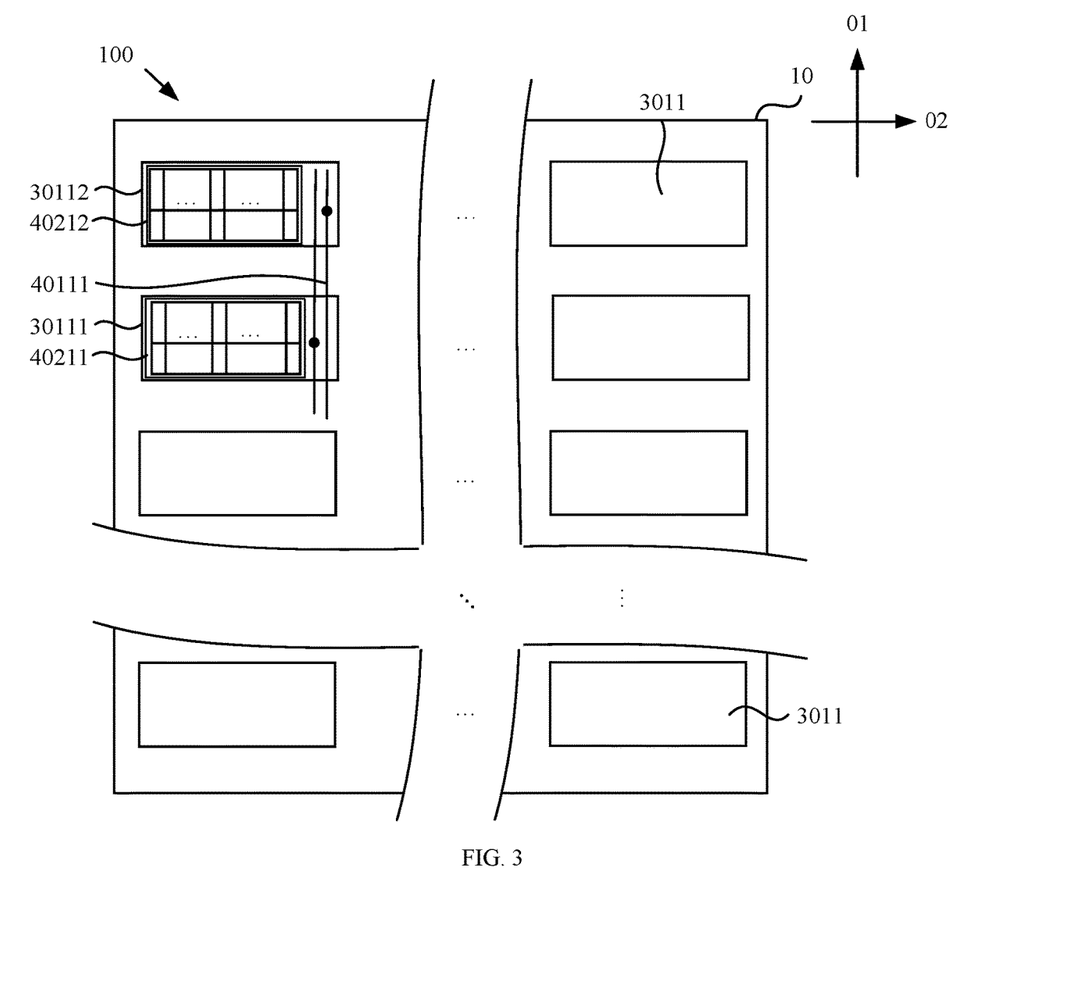
FIG. 3 is a bottom view of a touch layer in a third touch display panel provided in an embodiment of the present application.

Specifically, as shown in FIG. 2 and FIG. 3, adjacent second touch electrode 30112 and first touch electrode 30111 may be arranged in the first direction 01. Here, based on a fact that the first touch lead 40111 is not electrically connected to the first touch electrode 30111, but extends to be electrically connected to the second touch electrode 30112, that is, the first touch lead 40111 is overlapped with the first touch electrode 30111 and the second touch electrode 30112, as a result, the "larger blank area" mentioned above also exists in the second touch electrode 30112. For a same reason, if wiring is not set in the blank area, there will be a larger difference in wiring arrangement density between an area overlapped with the first touch lead 40111 in the second touch electrode 30112 and the larger blank area, making vertical projection distribution of the wirings in the second touch electrode 30112 uneven, resulting in uneven picture display.

It can be understood that based on the second touch electrode 30112 and the first touch lead 40111, the second auxiliary structure 40212 overlapped with the second touch electrode 30112 and located on at least one side of the first touch lead 40111 is further provided in the embodiment; that is, a vertical projection of the second auxiliary structure 40212 on the second touch electrode 30112 in this embodiment can be filled in the "larger blank area" mentioned above in the second touch electrode 30112, so as to weaken the difference in the wiring arrangement density between the "larger blank area" and an area where the first touch lead 40111 is projected, improve uniformity of wiring distribution in the second touch electrode 30112, and improve the uniformity of picture display of the touch display panel 100.

In an embodiment, as shown in FIG. 2, FIG. 6, and FIGS. 9 to 10 in combination, the second conductive layer 40 further includes a second touch lead 40112 overlapped with and electrically connected to the first touch electrode 30111. An overlapping area of the second auxiliary structure 40212 and the second touch electrode 30112 is greater than an overlapping area of the first touch electrode 30111 and the first auxiliary structure 40211.

Specifically, combined with the above-mentioned, because the first touch electrode 30111 is overlapped with the first touch lead 40111 and the second touch lead 40112, and the second touch electrode 30112 is only overlapped with the first touch lead 40111 and is not overlapped with the second touch lead 40112, resulting in an area of the "larger blank area" mentioned above in the first touch electrode 30111 smaller than an area of the "larger blank area" mentioned above in the second touch electrode 30112.

It can be understood that an overlapping portion of the second auxiliary structure 40212 and the second touch electrode 30112 can be located in the "larger blank area" mentioned above in the second touch electrode 30112; and an overlapping portion of the first touch electrode 30111 and the first auxiliary structure 40211 can be located in the "larger blank area" mentioned above in the first touch electrode 30111. Furthermore, if distribution densities of the first auxiliary structure 40211 and the second auxiliary structure 40212 are equal or similar, then it is consistent that the overlapping area of the second auxiliary structure 40212 and the second touch electrode 30112 is greater than the overlapping area of the first touch electrode 30111 and the first auxiliary structure 40211.

In an embodiment, as shown in FIGS. 4 to 10 in combination, the touch display panel 100 includes a touch layer 10 and a touch chip 20 located on one side of the touch layer 10. The touch layer 10 includes: a first conductive layer 30 including at least one touch electrode set 301; and the touch electrode set 301 includes a plurality of touch electrodes 3011 arranged along a first direction 01; a second conductive layer 40 arranged in a different layer from the first conductive layer 30 and including at least one touch lead set 401 and at least one auxiliary structure set 402 both corresponding to the at least one touch electrode set 301 one-to-one; the touch lead set 401 includes a plurality of touch leads 4011 corresponding to a plurality of touch electrodes 3011 one-to-one; and the auxiliary structure set 402 includes a plurality of auxiliary structures 4021 corresponding to the plurality of touch electrodes 3011 one-to-one; the touch leads 4011 are overlapped with the corresponding touch electrodes 3011 and are electrically connected between the corresponding touch electrodes 3011 and the touch chip 20; an insulation layer 50 located between the first conductive layer 30 and the second conductive layer 40. Wherein, the auxiliary structures 4021 are overlapped with the corresponding touch electrodes 3011. The auxiliary structure set 402 is located between each of the touch leads 4011 in the corresponding touch lead set 401 and a sixth side L6 of the touch electrode set 301. The sixth side L6 is a side of the touch electrode set 301 not closest to the corresponding touch lead set 401.

Specifically, the touch display panel 100 further includes a substrate, a circuit layer located on the substrate, and a pixel layer located on the circuit layer. The touch layer can be located on one side of the pixel layer away from the substrate. The pixel layer can be electrically connected to the circuit layer to obtain a pixel driving signal to achieve picture display. The touch layer 10 can be electrically connected to the circuit layer to obtain a touch driving signal to achieve a touch function. Wherein, the pixel layer may include a liquid crystal layer or a self-luminous display device. A touch insulation layer can be provided on one side of the touch layer 10 close to the pixel layer to insulate the touch layer 10 from the pixel layer. Specifically, for the touch layer 10, in a touch stage, the touch chip 20 can send the touch driving signal to each of the touch leads 4011 in sequence, so as to send the touch driving signal to each of the touch electrodes 3011, and can receive a touch sensing signal output by each of the touch electrodes 3011 through the corresponding touch lead 4011, so that the touch function is realized according to each of the touch sensing signals.

It should be noted that in the touch layer 10, for each touch electrode set 301, considering that the closer a distance between adjacent two touch leads 4011 in the corresponding touch lead set 401, the greater equivalent capacitance formed by the two touch leads 4011, which is more conducive to detection of open circuit or short circuit of the touch electrode 3011 in a later stage. Therefore, in this embodiment, there is a larger blank area between the plurality of touch leads 4011 and one side of the touch electrode set 301 in an arrangement direction of the plurality of touch leads 4011. If there is no wiring projected in the blank area, there will be a larger difference in wiring arrangement density between an area overlapped with the plurality of touch leads 4011 in the touch electrode set 301 and the larger blank area, making distribution of vertical projections of the wirings in the touch electrode set 301 uneven, resulting in uneven picture display.

It can be understood that combined with the above-mentioned, at least in the arrangement direction of the plurality of touch leads 4011, for the touch electrode set 301, a side closest to the corresponding touch lead set 401 exists. Other sides are farther away from the corresponding touch lead set 401 compared with the side and can be understood as the sixth side L6 in this embodiment. Therefore, it can be considered that a larger blank area can be formed between the sixth side L6 and the corresponding touch lead set 401 at least relative to the side closest to the corresponding touch lead set 401. Based on this, it should be consistent that the auxiliary structure 4021 overlapped with the corresponding touch electrode 3011 is further located between each of the touch leads 4011 in the corresponding touch lead set 401 and the sixth side L6 of the touch electrode set 301. That is, a projection of the auxiliary structure 4021 in this embodiment on the touch electrode set 301 can be filled in the "larger blank area" mentioned above in the touch electrode set 301, so as to weaken a difference in wiring arrangement density between the "larger blank area" and an area where the touch lead set 401 is projected, and improve uniformity of wiring distribution in the area corresponding to the touch electrode set 301, so that uniformity of picture display of the touch display panel 100 is improved.

Figure 4:
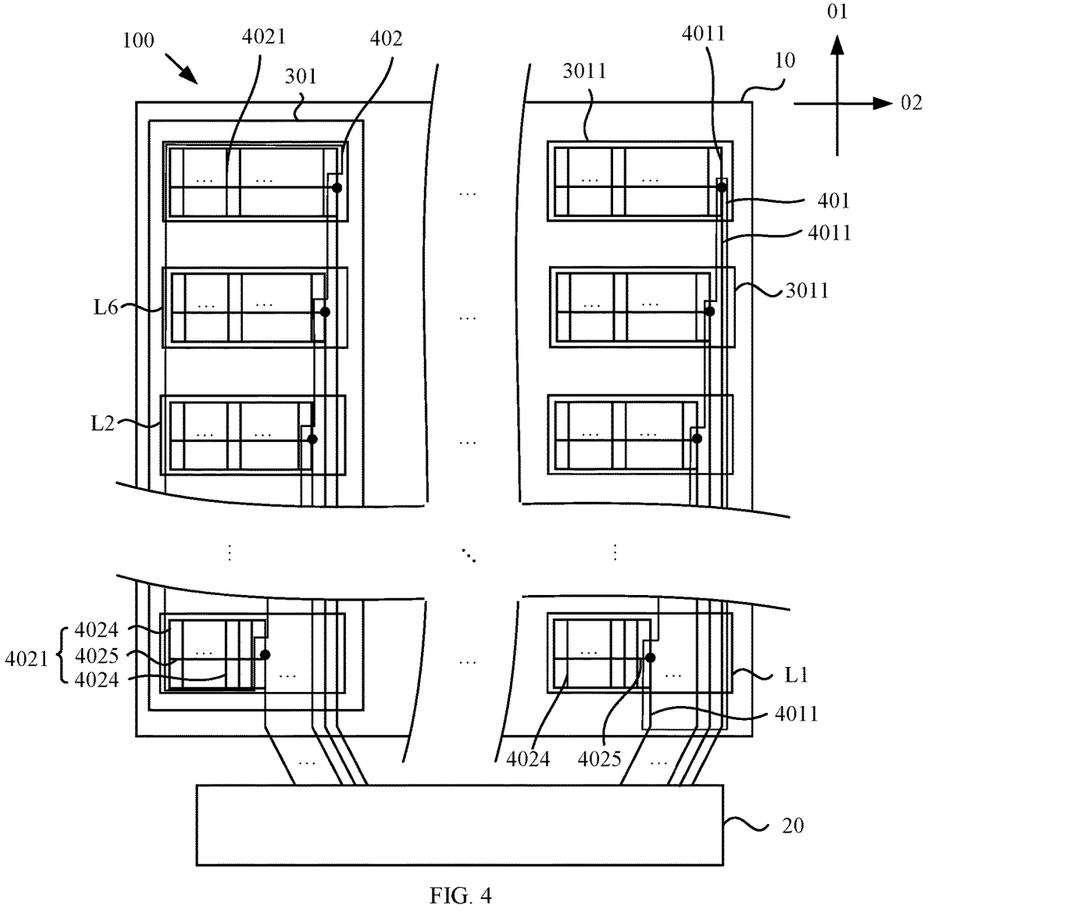
FIG. 4 is a bottom view of a touch layer in a fourth touch display panel provided in an embodiment of the present application.
Figure 10:
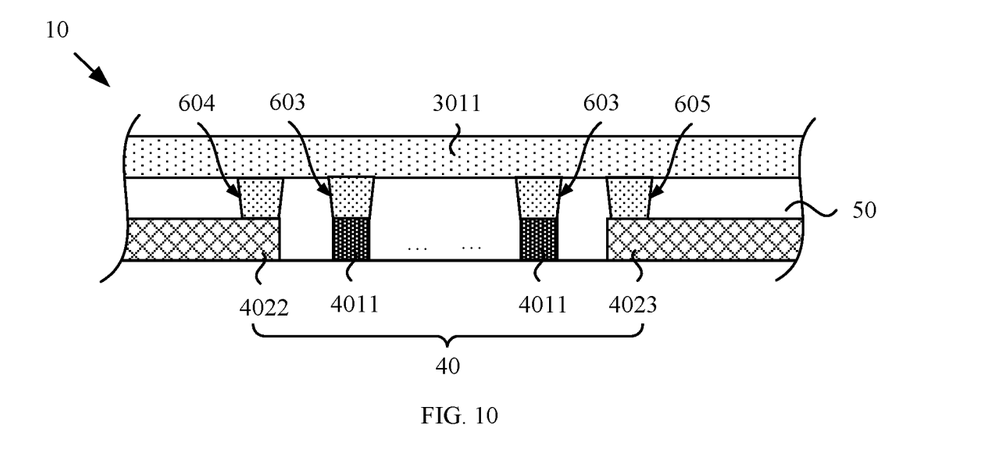
FIG. 10 is a schematic cross-sectional view of the touch electrodes located in the last row in the touch layer in FIG. 7.

Furthermore, as shown in FIG. 4 and FIG. 10 in combination, the touch lead set 401 can include a plurality of touch leads 4011 corresponding to the plurality of touch electrodes 3011 in a one-to-one correspondence and arranged along a second direction 02. The first direction 01 intersects with the second direction 02. Based on this, the sixth side L6 mentioned above can be understood as being perpendicular to the second direction 02. For example, the sixth side L6 can be parallel to the first direction. Furthermore, the "larger blank area" mentioned above can formed between the sixth side L6 and the corresponding touch lead set 401. That is, it can be considered that, in the second direction 02, the auxiliary structure set 402 is located on one side of each of the touch leads 4011 in the corresponding touch lead set 401, so as to be filled in the larger blank area.

Figure 5:
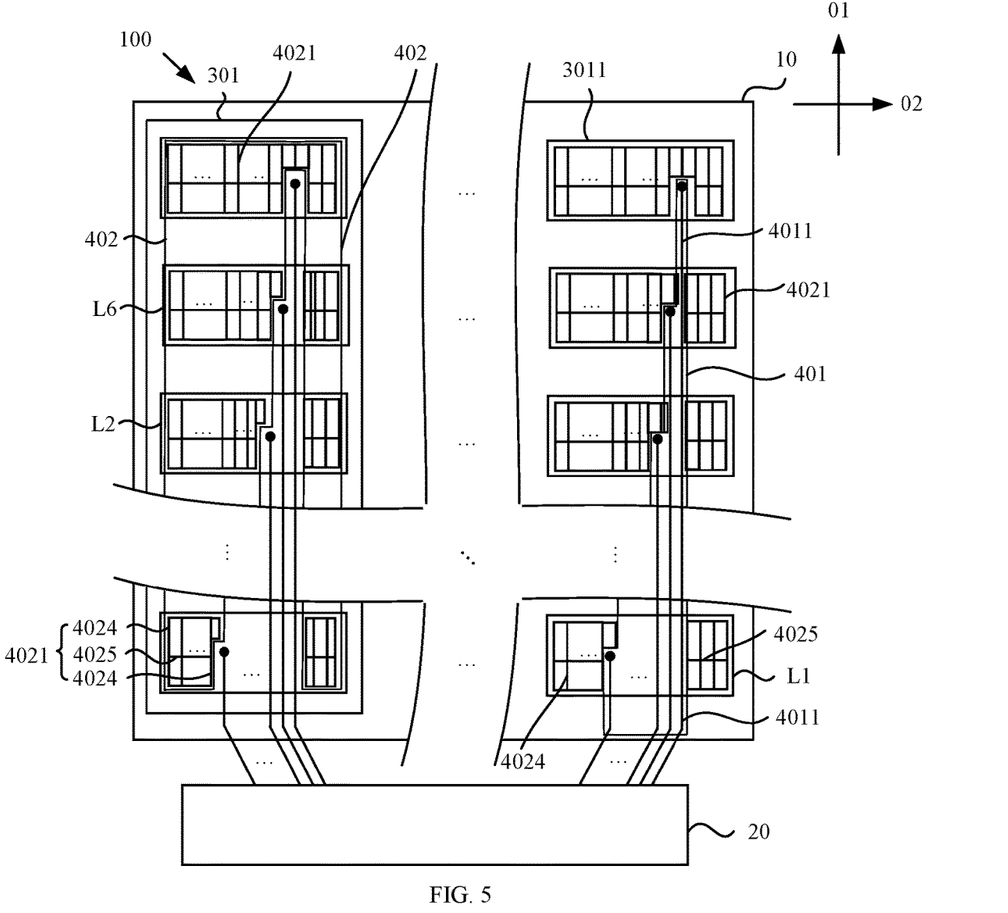
FIG. 5 is a bottom view of a touch layer in a fifth touch display panel provided in an embodiment of the present application.

In an embodiment, as shown in FIG. 4 and FIG. 5, in the touch lead set 401, in the plurality of touch leads 4011 other than a touch lead 4011 closest to the touch chip 20, each of the touch leads 4011 extends from a corresponding touch electrode 3011 to be overlapped with a plurality of touch electrodes 3011 closer to the touch chip 20 than the corresponding touch electrode 3011 in the touch electrode set 301, so as to be electrically connected to the touch chip 20; wherein the auxiliary structure 4021 corresponding to each of the touch leads 4011 is at least located on one side of the touch lead 4011 away from the touch chip 20.

Specifically, because the plurality of touch electrodes 3011 in the touch electrode set 301 are arranged along the first direction 01 in sequence, based on this, the plurality of touch leads 4011 corresponding to the plurality of touch electrodes 3011 one-to-one in the embodiment can extend along the first direction 01. For example, the first direction 01 is a column direction, the touch chip 20 can be located on a lower side of one touch electrode set 301 at least, so as to facilitate electrical connection between the touch electrode set 301 and the touch chip 20. Then the touch lead 4011 corresponding to each of the touch electrodes 3011 located above a last row can extend to be overlapped with a plurality of touch electrodes 3011 in all rows below. At a same time, the touch lead 4011 corresponding to the touch electrode 3011 located in the last row can directly extend to a plurality of touch electrodes 3011 away from an upper part to be electrically connected to the touch chip 20.

It should be noted that combined with the above-mentioned, because the touch lead 4011 corresponding to each of the touch electrodes 3011 located above the last row extends to the plurality of touch electrodes 3011 close to the touch chip 20, one side of each of the touch electrodes 3011 away from the touch chip 20 is not filled by the touch lead 4011, resulting in low wiring arrangement density. Furthermore, based on this, in the embodiment, the auxiliary structure 4021 corresponding to each of the touch leads 4011 is also arranged at least on one side of the touch lead 4011 away from the touch chip 20 to be filled in one side of each of the touch electrodes 3011 away from the touch chip 20, so as to reduce a difference in wiring arrangement density between the area and an area filled with the touch leads 4011, and further improve uniformity of wiring distribution in the area corresponding to the touch electrode set 301, so that the uniformity of picture display of the touch display panel 100 is improved.

In an embodiment, as shown in FIG. 4 and FIG. 5, in the auxiliary structure set 402, overlapping areas of the plurality of auxiliary structures 4021 corresponding one-to-one to the plurality of touch electrodes 3011 close to the touch chip 20 in sequence in the touch electrode set 301 and the corresponding touch electrodes 3011 decrease in sequence. Specifically, combined with the above-mentioned, the touch lead 4011 corresponding to each of the touch electrodes 3011 located above the last row extends to the plurality of touch electrodes 3011 close to the touch chip 20, that is, the closer the touch electrode 3011 to the touch chip 20, the larger an area occupied by the corresponding touch lead set 401. And in this embodiment, the auxiliary structure 4021 corresponding to each of the touch leads 4011 is arranged at least on the side of the touch lead 4011 away from the touch chip 20. Furthermore, in this embodiment, based on a fact that each auxiliary structure 4021 is also filled between the corresponding touch lead 4011 and the side of the corresponding touch electrode 3011, it can be considered that the auxiliary structure 4021 can be filled in an area of the corresponding touch electrode 3011 that is not occupied by the corresponding touch lead set 401. Therefore, it is presented that the closer the auxiliary structure in the auxiliary structure set 402 to the touch chip 20, the smaller an area of the auxiliary structure 4021.

It can be understood that combined with the above-mentioned, in this embodiment, projections of the touch lead 4011 and the corresponding auxiliary structure 4021 on the corresponding touch electrode 3011 can be dispersed on an entire area of the touch electrode 3011, so as to improve the uniformity of wiring distribution in the area corresponding to the touch electrode set 301, so as to improve the uniformity of picture display of the touch display panel 100.

In an embodiment, as shown in FIG. 4, the touch lead set 401 is arranged close to a first side L1 of the touch electrode set 301. Wherein, in the auxiliary structure set 402, each of the auxiliary structures 4021 extends from the corresponding touch lead 4011 to a second side L2 away from the first side L1 in the touch electrode set 301. It can be understood that because the touch lead set 401 is arranged close to the first side L1 of the touch electrode set 301 in the embodiment, the corresponding auxiliary structure 4021 can be continuously and completely distributed in an area defined by the second side L2 and the touch electrode set 301, which can prevent a change of a wiring pattern caused by a division of the auxiliary structure 4021 by the touch electrode set 301, and can further improve the uniformity of a wiring distribution in the area corresponding to the touch electrode set 301, so as to improve the uniformity of picture display of the touch display panel 100.

Of course, as shown in FIG. 5, the touch lead set 401 can also be arranged close to a middle portion of the touch electrode set 301, that is, the touch lead set 401 has a larger blank area at least with either side of two opposite sides of the touch electrode set 301, respectively. Furthermore, each of the auxiliary structures 4021 can be dispersed on the side of the corresponding touch lead 4011 away from the touch chip 20, and the corresponding auxiliary structure set 402 can be dispersed on the above-mentioned two larger blank areas to reduce a difference in wiring distribution density between the two blank areas and an area provided with the touch lead set 401, so as to improve the uniformity of wiring distribution in the area corresponding to the touch electrode set 301, so that the uniformity of picture display of the touch display panel 100 is improved.

In an embodiment, as shown in FIG. 4, the auxiliary structure 4021 directly contacts the corresponding touch lead 4011, so as to be electrically connected to the corresponding touch lead 4011. It can be understood that combined with the above-mentioned, based on a fact that each of the auxiliary structures 4021 extends from the corresponding touch lead 4011 to the second side L2 away from the first side L1 in the touch electrode set 301, that is, the auxiliary structure 4021 is continuously arranged on one side of the touch electrode set 301, the auxiliary structure 4021 in this embodiment can directly extend to contact the corresponding touch lead 4011 without hindrance, so as to realize electrical connection between the two, thereby reducing impedance of the corresponding touch lead 4011 and improving efficiency of signal transmission.

Specifically, each of the auxiliary structures 4021 and the corresponding touch lead 4011 may be made of a same material at a same time through a same process, so as to improve manufacturing efficiency of the touch layer 10. Furthermore, a corresponding mask can be set for a connection path combining each of the auxiliary structures 4021 and the corresponding touch lead 4011, and for a same reason, a mask can be set for simultaneously preparing at least one auxiliary structure set 402 and the corresponding at least one touch lead set 401 to form the second conductive layer 40 at one time.

Figure 6:
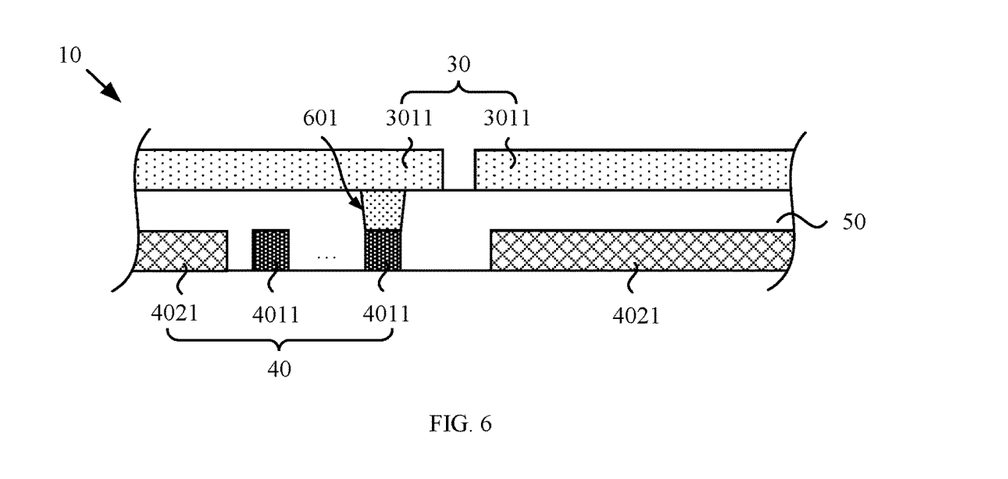
FIG. 6 is a schematic cross-sectional view of adjacent two touch electrodes located in a third row or a next row in the touch layer in FIG. 4.

Wherein, as shown in FIG. 6, FIG. 6 can be understood as a schematic cross-sectional view of adjacent two touch electrodes 3011 in a third row or a next row in the touch layer 10 in FIG. 4. Based on this, for example, each touch electrode 3011 may be configured to be connected to at least one of the corresponding auxiliary structure 4021 and the corresponding touch lead 4011 through at least one first via 601 to realize electrical connection to the corresponding touch lead 4011 to realize signal transmission. For another example, when the auxiliary structure 4021 is disconnected from the corresponding touch lead 4011, each of the touch electrodes 3011 can be set to be connected to the corresponding touch lead 4011 through the first via 601 to realize the electrical connection between the two. Specifically, the first via 601 may be located in the insulation layer 50, and the first via 601 may be filled with a conductive substance to electrically connect the touch electrode 3011 and the corresponding touch lead 4011.

It should be noted that, as shown in FIG. 5, because the touch lead set 401 is located at the middle portion of the touch electrode set 301, the corresponding auxiliary structure set 402 needs to be set around an upper side, a left side, and a right side of the touch lead set 401, that is, each part of the auxiliary structure 4021 corresponding to each of the touch leads 4011 cannot be electrically connected to the corresponding touch lead 4011. Furthermore, a plurality of touch leads 4011 corresponding one-to-one to a plurality of touch electrodes 3011, which are successively close to the touch chip 20, in the touch electrode set 301 are arranged in a direction away from the first side L1 as an example. In the touch lead set 401, except that the touch lead 4011 farthest from the touch chip 20 can be electrically connected to all of the corresponding auxiliary structures 4021, for a remaining plurality of touch leads 4011, the parts of the auxiliary structure 4021 located on the left side and the upper side of the corresponding touch leads 4011 can be electrically connected to the corresponding touch leads 4011, and the part of the auxiliary structure 4021 located on the right side of the corresponding touch lead 4011 is disconnected from the corresponding touch lead 4011.

In an embodiment, as shown in FIG. 3, FIG. 6, and FIGS. 9 to 10 in combination, the second conductive layer 40 further includes a second touch lead 40112 overlapped with and electrically connected to the first touch electrode 30111. The second touch lead 40112 extends to be overlapped with the second touch electrode 30112. An overlapping area of the second auxiliary structure 40212 and the second touch electrode 30112 is equal to an overlapping area of the first touch electrode 30111 and the first auxiliary structure 40211.

Specifically, combined with the above-mentioned, a difference between the embodiment and the embodiment in FIG. 3 is that: the second touch lead 40112 further extends to be overlapped with the second touch electrode 30112, that is, both the first touch electrode 30111 and the second touch electrode 30112 are overlapped with the first touch lead 40111 and the second touch lead 40112, making the "larger blank area" mentioned above in the first touch electrode 30111 equal to the "larger blank area" mentioned above in the second touch electrode 30112.

It can be understood that an overlapping portion of the second auxiliary structure 40212 and the second touch electrode 30112 in the embodiment can be located in the "larger blank area" mentioned above in the second touch electrode 30112. An overlapping portion of the first touch electrode 30111 and the first auxiliary structure 40211 can be located in the "larger blank area" mentioned above in the first touch electrode 30111. Furthermore, if distribution densities of the first auxiliary structure 40211 and the second auxiliary structure 40212 are equal or similar, it is consistent that the overlapping area of the second auxiliary structure 40212 and the second touch electrode 30112 is equal to the overlapping area of the first touch electrode 30111 and the first auxiliary structure 40211.

Figure 7:
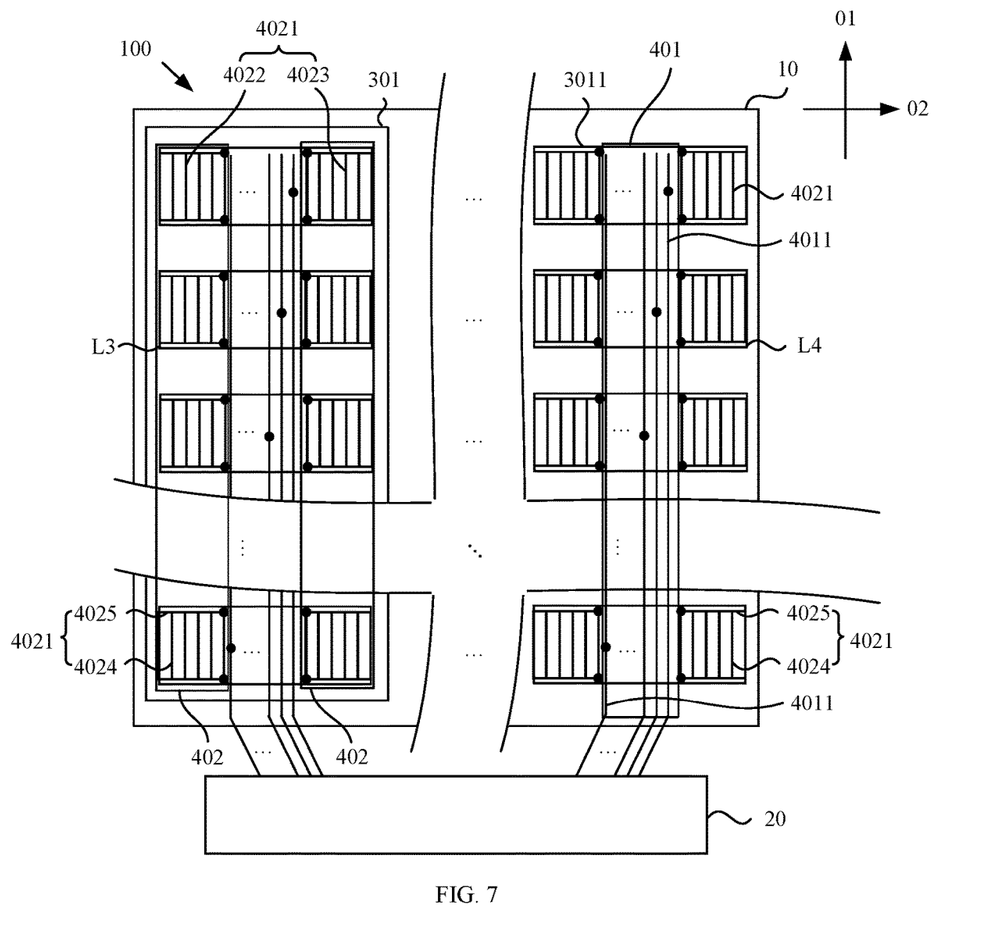
FIG. 7 is a bottom view of a touch layer in a sixth touch display panel provided in an embodiment of the present application.
Figure 8:
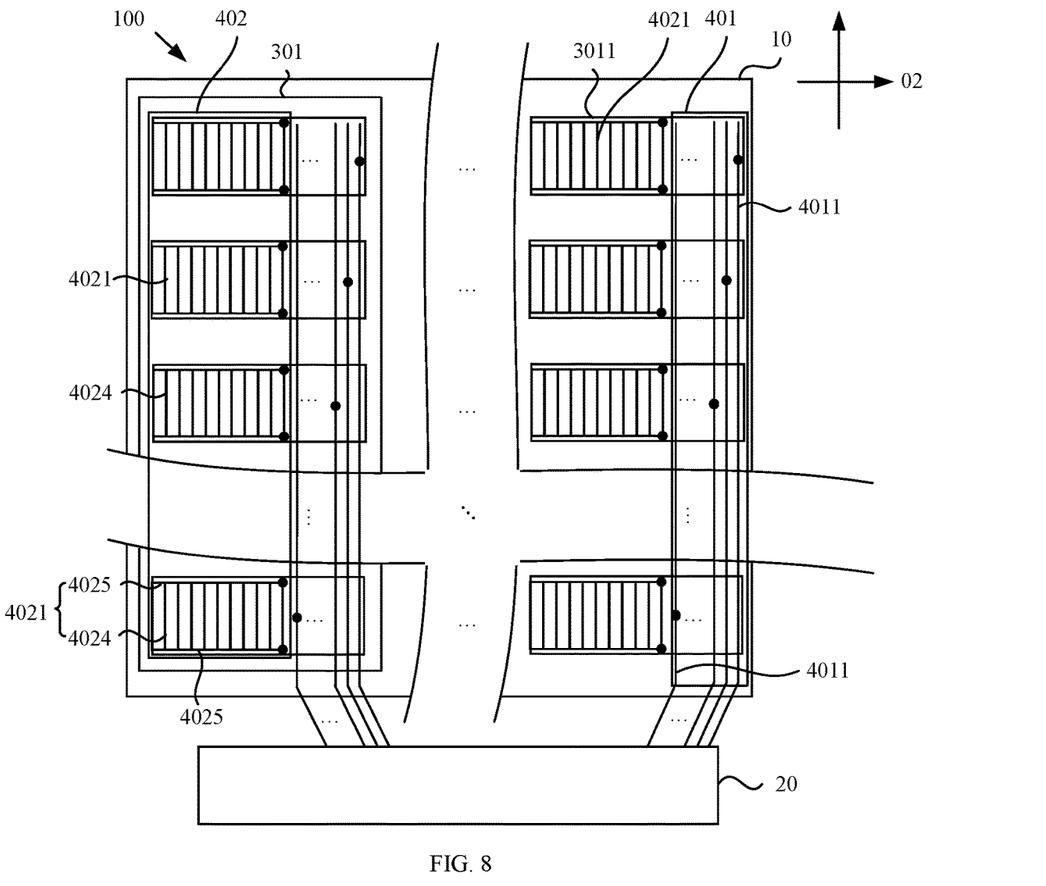
FIG. 8 is a bottom view of a touch layer in a seventh touch display panel provided in an embodiment of the present application.

In an embodiment, as shown in FIG. 7 and FIG. 8, in the touch lead set 401, each of the touch leads 4011 extends from a corresponding touch electrode 3011, so as to be overlapped with a remaining plurality of touch electrodes 3011 in the touch electrode set 301, so as to be electrically connected to the touch chip 20. It can be understood that compared with the embodiment shown in FIG. 4 and FIG. 5, each of the touch leads 4011 in the touch lead set 401 in the embodiment can extend along the first direction 01 to cover each of the touch electrodes 3011 in the touch electrode set 301, that is, an area occupied by the corresponding touch lead set 401 in each of the touch electrodes 3011 is equal; that is, at least in the first direction 01, distribution density of a projection of the touch lead set 401 on the touch electrode set 301 is equal everywhere, which helps to improve the uniformity of the wiring distribution in the area corresponding to the touch electrode set 301, thereby improving the uniformity of picture display of the touch display panel 100.

Figure 9:
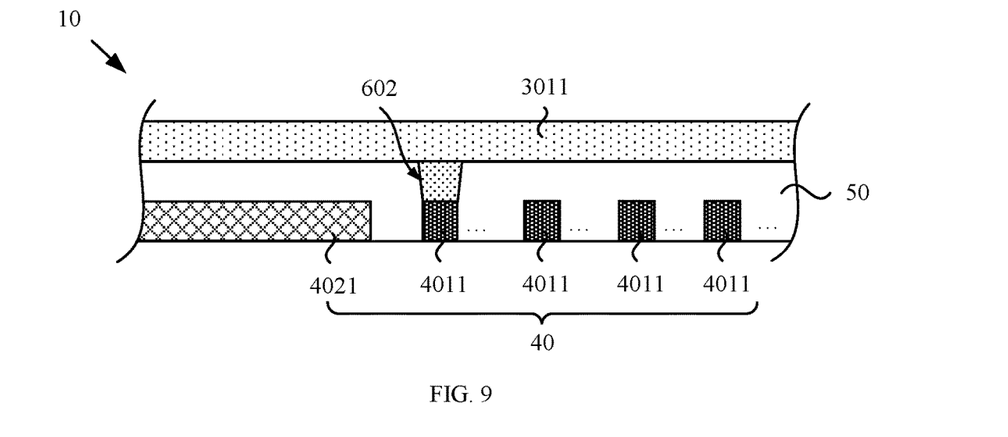
FIG. 9 is a schematic cross-sectional view of touch electrodes located in a last row of the touch layer in FIG. 7 or FIG. 8.

Specifically, in this embodiment, a specific position of the projection of each touch lead set 401 on the touch electrode set 301 is not limited. For example, in FIG. 8, the projection of the touch lead set 401 on the touch electrode set 301 may be close to one side of the touch electrode set 301. For another example, in FIG. 7, the projection of the touch lead set 401 on the touch electrode set 301 may be located in a middle portion of the touch electrode set 301. Specifically, in this embodiment, an arrangement order of the plurality of touch leads 4011 corresponding one-to-one to the plurality of touch electrodes 3011, which are successively close to the touch chip 20, in the touch electrode set 301 is not limited. Furthermore, as shown in FIG. 9 in combination, FIG. 9 can be understood as a schematic cross-sectional view of the touch electrode 3011 located in a last row in the touch layer 10 in FIG. 7 or FIG. 8. That is, each of the touch leads 4011 can be connected to the corresponding touch electrode 3011 through a second via 602 to realize the electrical connection to the corresponding touch electrode 3011 to realize signal transmission. Specifically, the second via 602 may be located in the insulation layer 50, and the second via 602 may be filled with a conductive substance to electrically connect the touch electrode 3011 and the corresponding touch lead 4011.

In an embodiment, as shown in FIG. 7 and FIG. 8, in the auxiliary structure set 402, areas of the plurality of the auxiliary structures 4021 are equal. Specifically, combined with the above-mentioned, in the touch lead set 401, each of the touch leads 4011 extends from the corresponding touch electrode 3011, so as to be overlapped with the remaining plurality of touch electrodes 3011 in the touch electrode set 301; that is, in the touch electrode set 301, an area occupied by the corresponding touch lead set 401 in each of the touch electrodes 3011 is equal. Furthermore, in this embodiment, based on a fact that each auxiliary structure 4021 is also filled between the corresponding touch lead set 401 and a side of the corresponding touch electrode 3011, it can be considered that the auxiliary structure 4021 can be filled in an area of the corresponding touch electrode 3011 that is not occupied by the corresponding touch lead set 401. Therefore, it is presented that the areas of the plurality of auxiliary structures 4021 in the auxiliary structure set 402 are equal.

It can be understood that combined with the above-mentioned, in this embodiment, projections of the touch lead 4011 and the corresponding auxiliary structure 4021 on the corresponding touch electrode 3011 can be dispersed on an entire area of the touch electrode 3011, so as to improve the uniformity of wiring distribution in the area corresponding to the touch electrode set 301, thereby improving the uniformity of picture display of the touch display panel 100.

In an embodiment, as shown in FIG. 7, the touch lead set 401 is arranged opposite to a middle portion of the touch electrode set 301, and the touch electrode set 301 includes a third side L3 and a fourth side L4 both arranged opposite to the corresponding touch lead set 401. Wherein, in the auxiliary structure set 402, each of the auxiliary structures 4021 includes a first sub auxiliary structure 4022 extending from the corresponding touch lead set 401 to the corresponding third side L3 and a second sub auxiliary structure 4023 extending from the corresponding touch lead set 401 to the corresponding fourth side L4.

Wherein, based on a fact that, the plurality of touch leads 4011 extend along the first direction 01, the third side L3 can be a left side of the touch electrode set 301, and the fourth side L4 can be a right side of the touch electrode set 301. Specifically, the touch lead set 401 in the embodiment is arranged opposite to the middle portion of the touch electrode set 301, and the corresponding first sub auxiliary structure 4022 is distributed on a left side of the corresponding touch lead set 401, and the corresponding second sub auxiliary structure 4023 is distributed on the right side of the corresponding touch lead set 401. It can be understood that compared with the embodiment shown in FIG. 7, the first sub auxiliary structure 4022 and the corresponding second sub auxiliary structure 4023 in this embodiment can be approximately symmetrically distributed on both sides of the corresponding touch lead set 401, which can improve symmetry of distribution of the touch lead set 401 and the corresponding auxiliary structure set 402. Even if it is not possible to make wiring distribution density in each area equal, it can prevent excessive differences in the wiring distribution between adjacent two parts.

In an embodiment, as shown in FIG. 7 and FIG. 10 in combination, FIG. 10 can be understood as a schematic cross-sectional view of the touch electrode 3011 located in the last row in the touch layer 10 in FIG. 7. The first sub auxiliary structure 4022, the second sub auxiliary structure 4023, and the touch leads 4011 are all electrically connected to the corresponding touch electrodes 3011, so that the auxiliary structure 4021 is electrically connected to the corresponding touch leads 4011. It can be understood that combined with the above-mentioned, each touch lead 4011 can be electrically connected to the corresponding touch electrode 3011 through a third via 603; the corresponding first sub auxiliary structure 4022 can be electrically connected to the corresponding touch electrode 3011 through a fourth via 604; and the corresponding second sub auxiliary structure 4023 can be electrically connected to the corresponding touch electrode 3011 through a fifth via 605. Specifically, the third via 603, the fourth via 604, and the fifth via 605 may be located in the insulation layer 50. The third via 603, the fourth via 604, and the fifth via 605 may be filled with conductive substance to make the touch electrode 3011, the corresponding first sub auxiliary structure 4022, and the corresponding second sub auxiliary structure 4023 be electrically connected to the corresponding touch leads 4011, respectively.

It can be understood that combined with the above-mentioned, the auxiliary structure 4021 in the embodiment can be electrically connected to the corresponding touch lead 40111 through the corresponding touch electrode 3011, so as to reduce impedance of the corresponding touch lead 4011 and improve efficiency of signal transmission.

In an embodiment, as shown in FIGS. 4 to 10 in combination, the auxiliary structure 4021 includes a plurality of first sub auxiliary lines 4024 arranged along the second direction 02; wherein arrangement density of the plurality of first sub auxiliary lines 4024 is same as arrangement density of the plurality of touch leads 4011.

Specifically, combined with the above-mentioned, the sixth side L6, the first side L1, the second side L2, and the third side L3 can all be parallel to the second direction 02. Furthermore, the second direction 02 can be perpendicular to the first direction 01. It can be understood that the plurality of first sub auxiliary lines 4024 and the plurality of touch leads 4011 are set to be parallel to the second direction 02 in this embodiment. That is, an arrangement direction and distribution density of projections of the plurality of first sub auxiliary lines 4024 on the corresponding touch electrode 3011 can be consistent with an arrangement direction and distribution density of projections of the plurality of touch leads 4011 on the corresponding touch electrode 3011, reducing a difference in wiring arrangement density between an area provided with the plurality of first sub auxiliary lines 4024 and an area filled with the touch leads 4011, and the uniformity of wiring distribution in the area corresponding to the touch electrode set 301 is further improved, thereby improving the uniformity of picture display of the touch display panel 100. For example, based on a fact that the plurality of touch leads 4011 in the touch lead set 401 are arranged along the second direction 02, an interval between adjacent two first sub auxiliary lines 4024 can be equal to an interval between adjacent two touch leads 4011.

Furthermore, based on the embodiment shown in FIG. 7 and FIG. 8, in the auxiliary structure set 402, a connecting line portion can be provided between adjacent two auxiliary structures 4021. The connecting line portion can include a plurality of connecting lines corresponding to the plurality of first sub auxiliary lines 4024 one-to-one, and each connecting line can be connected between the corresponding two first sub auxiliary lines 4024. It can be understood that a plurality of connecting lines with distribution density comparable to the distribution density of the plurality of first sub auxiliary lines 4024 in the area corresponding to the touch electrodes 3011 can thus be provided in a blind area in a display area other than the plurality of touch electrodes 3011, further improving uniformity of wiring distribution in the display area, thereby improving the uniformity of picture display of the touch display panel 100.

In an embodiment, as shown in FIG. 2 and FIG. 3, both the first auxiliary structure 40211 and the second auxiliary structure 40212 are located on a same side of the first touch lead 40111. Specifically, combined with the above-mentioned, in the second direction 02, a vertical projection of the first touch lead 40111 on the first touch electrode 30111 fully occupies the first touch electrode 30111; and then, according to a fact that the first touch lead 40111 is close to a left side or a right side of the first touch electrode 30111 and the second touch electrode 30112, the first auxiliary structure 40211 and the second auxiliary structure 40212 can be set on a right side or a left side of the first touch lead 40111. Furthermore, in the second direction 02, for example, in FIG. 2, a vertical projection of the first touch lead 40111 on the second touch electrode 30112 does not fully occupy the second touch electrode 30112, the first auxiliary structure 40211 can also be located on an upper portion of the first touch lead 40111 compared with the second auxiliary structure 40212. For another example, in FIG. 3, the vertical projection of the first touch lead 40111 on the second touch electrode 30112 also fully occupies the second touch electrode 30112, so the first auxiliary structure 40211 and the second auxiliary structure 40212 may both be located on the left side of the first touch lead 40111.

In an embodiment, as shown in FIGS. 4 to 10 in combination, the auxiliary structure 4021 further includes a plurality of second sub auxiliary lines 4025. The second sub auxiliary lines 4025 are connected between at least one of adjacent two first sub auxiliary lines 4024, and adjacent first sub auxiliary line 4024 and the touch lead 4011. It can be understood that compared with an embodiment with only setting a plurality of first sub auxiliary lines 4024 arranged in parallel along the second direction 02, the embodiment adds the plurality of second sub auxiliary lines 4025 arranged in a manner different from the plurality of first sub auxiliary lines 4024. In terms of impedance, when the second sub auxiliary line 4025 is also connected between the adjacent first sub auxiliary line 4024 and the touch lead 4011, that is, when the auxiliary structure 4021 is electrically connected to the corresponding touch lead 4011, the plurality of first sub auxiliary lines 4024 in this embodiment can be electrically connected through the plurality of second sub auxiliary lines 4025, thereby reducing overall impedance of the auxiliary structure 4021 and the corresponding touch lead 4011 and improving efficiency of signal transmission. In terms of wiring arrangement density, the plurality of first sub auxiliary lines 4024 arranged in parallel along the second direction 02 can make the auxiliary structure 4021 have density in the second direction 02, and the plurality of second sub auxiliary lines 4025 arranged along a direction different from the second direction 02 can make the auxiliary structure 4021 have density in other directions different from the second direction 02, thereby reducing singularity of wiring arrangement directions in the auxiliary structure 4021; in other words, diversity of the wiring arrangement directions in the auxiliary structure 4021 can be improved, and wiring distribution of the auxiliary structure 4021 can be further homogenized to improve the uniformity of the wiring distribution in the area corresponding to the touch electrode set 301, thereby improving the uniformity of picture display of the touch display panel 100.

In an embodiment, as shown in FIGS. 4 to 10, the auxiliary structure 4021 is electrically connected to the corresponding touch lead 4011 through vias in the insulation layer 50. Specifically, combined with the above-mentioned, when the auxiliary structure 4021 is completely and continuously arranged around the corresponding touch lead 4011, that is, the auxiliary structure 4021 is not separated into at least two parts by other touch leads 4011, at this time, the auxiliary structure 4021 can directly contact the corresponding touch electrode 3011 to realize electrical connection. When the auxiliary structure 4021 is separated into at least two parts by other touch leads 4011 except the corresponding touch lead 4011, the auxiliary structure 4021 can be electrically connected to the corresponding touch electrode 3011 through the corresponding via, and the touch lead 4011 can also be electrically connected to the corresponding touch electrode 3011 through the corresponding via; with the corresponding touch electrode 3011 as a connecting portion, electrical connection between the auxiliary structure 4021 and the corresponding touch electrode 3011 is realized. The vias can include, but not limited to, the first via 601, the second via 602, the third via 603, the fourth via 604, or the fifth via 605 mentioned above, which is not limited here. It can be understood that the auxiliary structure 4021 in this embodiment is electrically connected to the corresponding touch lead 4011, which can reduce overall impedance of the auxiliary structure 4021 and the corresponding touch lead 4011 and improve the efficiency of signal transmission.

An electronic terminal is provided in an embodiment of the present application, and the electronic terminal includes the touch display panel as mentioned in any one embodiment above.

The touch display panel and the electronic terminal provided in the embodiments of the present application include the first conductive layer including the plurality of touch electrodes arranged along the first direction and the second direction, the first direction is different from the second direction, and the plurality of touch electrodes include the first touch electrode; the second conductive layer arranged on one side of the first conductive layer; the insulation layer arranged between the first conductive layer and the second conductive layer; wherein the second conductive layer includes the first touch lead and the first auxiliary structure both overlapped with the first touch electrode, and the first auxiliary structure is located on at least one side of the first touch lead. In the present application, the first auxiliary structure overlapped with the first touch electrode and located on at least one side of the first touch lead is provided to increase the wiring distribution density in the area of the first touch electrode where the first touch lead is not projected, so as to weaken the difference in the wiring arrangement density between the area and an area where the first touch lead is projected and improve the uniformity of projected wiring distribution in the first touch electrode, thereby improving the uniformity of picture display of the touch display panel.

The touch display panel and electronic terminal provided by the embodiments of the present application are described in detail above. In this paper, specific examples are applied to explain principle and implementation mode of the present application. The description of the above embodiments is only used to help understand technical scheme and its core idea of the present application. Those skilled in the art should understand that they can still modify the technical solutions recorded in the preceding embodiments, or equivalent replace some of the technical features. These modifications or substitutions do not make essence of the corresponding technical solution separate from a scope of the technical solutions of the embodiments of the present application.

What is claimed is:

1. A touch display panel, comprising:
a first conductive layer comprising a plurality of touch electrodes arranged along a first direction and a second direction, the first direction being different from the second direction, and the plurality of touch electrodes comprising a first touch electrode;
a second conductive layer arranged on one side of the first conductive layer; and
an insulation layer arranged between the first conductive layer and the second conductive layer;
wherein the second conductive layer comprises a first touch lead and a first auxiliary structure both overlapped with the first touch electrode, and the first auxiliary structure is located on at least one side of the first touch lead;

the first conductive layer further comprises a second touch electrode arranged along the first direction with the first touch electrode, and the first touch lead extends to overlap with and electrically connect to the second touch electrode;

the second conductive layer further comprises a second auxiliary structure overlapped with the second touch electrode, and the second auxiliary structure is located on at least one side of the first touch lead;

the second conductive layer further comprises a second touch lead overlapped with and electrically connected to the first touch electrode, and the second touch lead extends to overlap with the second touch electrode; and an overlapping area of the second auxiliary structure and the second touch electrode is equal to an overlapping area of the first touch electrode and the first auxiliary structure.

2. The touch display panel as claimed in claim 1, further comprising a touch chip located at one side of the first conductive layer;

the plurality of touch electrodes arranged along the first direction form a touch electrode set; and the second conductive layer comprises a touch lead set and an auxiliary structure set both corresponding to the touch electrode set; the touch lead set comprises a plurality of touch leads corresponding to the plurality of touch electrodes in a one-to-one correspondence, and the auxiliary structure set comprises a plurality of auxiliary structures corresponding to the plurality of touch electrodes in a one-to-one correspondence; the touch electrodes are electrically connected to the touch chip through the corresponding touch leads, and the touch leads and corresponding ones of the auxiliary structures are overlapped in the corresponding touch electrodes; and wherein the auxiliary structure set is located on one side of each of the touch leads in the touch lead set.

3. The touch display panel as claimed in claim 2, wherein in the touch lead set, each of the touch leads extends from the corresponding touch electrode to overlap with a remaining plurality of touch electrodes in the touch electrode set, so as to electrically connect to the touch chip.

4. The touch display panel as claimed in claim 3, wherein in the auxiliary structure set, areas of the plurality of auxiliary structures are equal.

5. The touch display panel as claimed in claim 3, wherein the touch lead set is arranged opposite to a middle portion of the touch electrode set, and the touch electrode set comprises a third side and a fourth side both arranged opposite to the touch lead set; and wherein in the auxiliary structure set, each of the auxiliary structures comprises a first sub auxiliary structure extending from the corresponding touch lead set to the the third side corresponding to the touch lead set and a second sub auxiliary structure extending from the corresponding touch lead set to the fourth side corresponding to the touch lead set.

6. The touch display panel as claimed in claim 5, wherein the first sub auxiliary structure, the second sub auxiliary structure, and the touch leads are all electrically connected to the corresponding touch electrodes, so that the auxiliary structure is electrically connected to the corresponding touch leads.

7. The touch display panel as claimed in claim 1, wherein both the first auxiliary structure and the second auxiliary structure are located on a same side of the first touch lead.

8. An electronic terminal, wherein the electronic terminal comprises the touch display panel as claimed in claim 1.

9. A touch display panel, comprising:
a first conductive layer comprising a plurality of touch electrodes arranged along a first direction and a second direction, the first direction being different from the second direction, and the plurality of touch electrodes comprising a first touch electrode;
a second conductive layer arranged on one side of the first conductive layer; and
an insulation layer arranged between the first conductive layer and the second conductive layer;
wherein the second conductive layer comprises a first touch lead and a first auxiliary structure both overlapped with the first touch electrode, and the first auxiliary structure is located on at least one side of the first touch lead; the first conductive layer further comprises a second touch electrode arranged along the first direction with the first touch electrode, and the first touch lead extends to overlap with and electrically connect to the second touch electrode;
the second conductive layer further comprises a second auxiliary structure overlapped with the second touch electrode, and the second auxiliary structure is located on at least one side of the first touch lead; the second conductive layer further comprises a second touch lead overlapped with and electrically connected to the first touch electrode;
an overlapping area of the second auxiliary structure and the second touch electrode is greater than an overlapping area of the first touch electrode and the first auxiliary structure;
the touch display panel further comprising a touch chip located at one side of the first conductive layer;
the plurality of touch electrodes arranged along the first direction form a touch electrode set;
the second conductive layer comprises a touch lead set and an auxiliary structure set both corresponding to the touch electrode set; the touch lead set comprises a plurality of touch leads corresponding to the plurality of touch electrodes in a one-to-one correspondence, and the auxiliary structure set comprises a plurality of auxiliary structures corresponding to the plurality of touch electrodes in a one-to-one correspondence; the touch electrodes are electrically connected to the touch chip through the corresponding touch leads, and the touch leads and corresponding ones of the auxiliary structures are overlapped in the corresponding touch electrodes; and
the auxiliary structure set is located on one side of each of the touch leads in the touch lead set;
wherein the auxiliary structure is electrically connected to the corresponding touch leads through vias in the insulation layer.

10. The touch display panel as claimed in claim 9, wherein in the touch lead set, in the plurality of touch leads other than a touch lead closest to the touch chip, each of the touch leads extends from a corresponding touch electrode to overlap with a plurality of touch electrodes closer to the touch chip than the corresponding touch electrode in the touch electrode set, so as to be electrically connected to the touch chip;
wherein the auxiliary structure corresponding to each of the touch leads is at least located on one side of the touch lead away from the touch chip.

11. The touch display panel as claimed in claim 10, wherein in the auxiliary structure set, overlapping areas of the plurality of auxiliary structures in the one-to-one correspondence to the plurality of touch electrodes successively close the touch chip in the touch electrode set and corresponding ones of the touch electrodes decrease in sequence.

12. The touch display panel as claimed in claim 10, wherein the touch lead set is arranged close to a first side of the touch electrode set;

wherein in the auxiliary structure set, each auxiliary structure extends from the corresponding touch lead to a second side away from the first side in the touch electrode set.

13. The touch display panel as claimed in claim 9, wherein the plurality of touch leads in the touch lead set are arranged along the second direction; and the auxiliary structure comprises a plurality of first sub auxiliary lines arranged along the second direction; and wherein an interval between adjacent two first sub auxiliary lines is equal to an interval between adjacent two touch leads.

\* \* \* \* \*